United States Patent
Bryant et al.

(10) Patent No.: US 7,194,179 B1
(45) Date of Patent: Mar. 20, 2007

(54) ASSEMBLY TOOL AND OPTICAL CONNECTOR ASSEMBLY METHOD

(75) Inventors: Johnny P. Bryant, Austin, TX (US); James R. Bylander, Austin, TX (US); James B. Carpenter, Austin, TX (US); Steven L. Johnson, Rockdale, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/318,957

(22) Filed: Dec. 27, 2005

(51) Int. Cl.
*G02B 6/00* (2006.01)
(52) U.S. Cl. ..................................... 385/134
(58) Field of Classification Search ............... 385/134
See application file for complete search history.

(56) References Cited

U.S. PATENT DOCUMENTS

| | | |
|---|---|---|
| 5,159,655 A | 10/1992 | Ziebol et al. |
| 5,179,608 A | 1/1993 | Ziebol et al. |
| 5,261,020 A * | 11/1993 | de Jong et al. ............... 385/76 |
| 5,337,390 A | 8/1994 | Henson et al. |
| 5,381,498 A | 1/1995 | Bylander |
| 5,408,558 A | 4/1995 | Fan |
| 5,414,790 A * | 5/1995 | Lee et al. .................... 385/139 |
| 5,734,770 A | 3/1998 | Carpenter et al. |
| 5,757,997 A | 5/1998 | Birrell et al. |
| 5,761,360 A | 6/1998 | Grois et al. |
| 5,812,718 A | 9/1998 | Carpenter et al. |
| 5,855,503 A | 1/1999 | Csipkes et al. |
| 6,439,780 B1 * | 8/2002 | Mudd et al. ................ 385/83 |
| 6,846,111 B2 | 1/2005 | Otsu et al. |

FOREIGN PATENT DOCUMENTS

WO    WO 02/056060 A2    7/2002

OTHER PUBLICATIONS

Instruction Manual, "3M Crimplok™ ST* and SC Non-Adhesive Fiber Optic Single & Multi-mode Connectors"; 3M Telecom Systems Division, Austin, TX (Feb. 1999); 26 pgs.
Information Sheet, "Singlemode Fiber connector—Endface Workmanship"; ADC Telecommunications; Inc. (Oct. 2002); No. 1228830; 5 pgs.
Product Brochure, "LightCrimp Connectors", AMP Netconnect; Tyco Electronics Corp. (Oct. 28, 2004); 2 pgs.
Vander Ploeg, T., & Steiner, R.; "Mechanical or Adhesive? Choosing the Best Fiber Connector for Every Installation"; Technical Paper, Leviton Voice and Data Division, Bothell, WA [on line]; [retrieved from the internet on Nov. 3, 2005], 3 pgs.; URL <http://www.levitonvoicedata.com/learning/documents/FiberConnectorsWhitePaper.pdf>.

(Continued)

*Primary Examiner*—Frank G. Font
*Assistant Examiner*—Jerry Martin Blevins
(74) *Attorney, Agent, or Firm*—Gregg H. Rosenblatt (57) ABSTRACT

An assembly tool for installing an optical fiber in an optical connector includes a base having a connector mounting region to receive and secure the optical connector on the base, the connector including a housing and a ferrule. The assembly tool further includes a protrusion setting mechanism to set a protrusion of the terminal end of the optical fiber, the protrusion corresponding to a distance the terminal end of the fiber extends from an end face of the connector ferrule.

20 Claims, 7 Drawing Sheets

OTHER PUBLICATIONS

"SC Thread-Lock® Connector Assembly Instructions"; Instruction Manual, Leviton Voice and Data Division, Bothell, WA [on line]; [retrieved from the internet on Nov. 3, 2005], 10 pgs.; URL <http://www.levitonvoicedata.com/support/documents/instructionsheets/49884SSC.pdf>.

* cited by examiner

ASSEMBLY TOOL AND OPTICAL CONNECTOR ASSEMBLY METHOD

BACKGROUND OF THE INVENTION

1. Field of the Invention

The present invention is directed to an apparatus and method for assembling remote grip ferrule-based optical connectors.

2. Background

In the area of optical telecommunication networks, fiber optic connectors are one of the primary ways to connect two or more optical fibers. There are several classes of optical fiber connectors including adhesive ferruled connectors, in which the fiber tip is held in a substantially fixed position relative to the tip of the ferrule by adhesively securing the fiber within the bore of the ferrule. Another class of connectors includes non-ferrule connectors, which rely on the buckling of a length of fiber to create contact pressure. Another class of connectors includes remote grip (ferruled) connectors, where the fiber is secured at some distance away from the terminal end or tip of the fiber.

When installing a remote grip connector in the field, one current practice uses a coplanar/flush polish. In remote grip connectors, as with other connector types, low optical losses and minimal reflections are achieved when the terminal ends of at least two optical fibers make secure physical contact. However, any differences in the coefficient of expansion between the fiber and the ferrule assembly may result in a non-contacting fiber tip when the temperature is raised, or lowered. The resulting gap can lead to significant reflection. A conventional remote grip connector is described in U.S. Pat. No. 5,408,558.

Another current practice involves a technician performing a field polish to create a fiber terminal end which protrudes beyond the ferrule tip. This method of polishing remote grip connectors produces a range of protrusions that provide a secure physical contact while avoiding excess force on the fiber tips. This method, when conscientiously followed, is sufficient to allow sufficient physical contact of the at least two fiber terminal end faces at temperatures for indoor applications (0° C.–60° C.). However, the conventionally polished field-terminated remote grip connector may not be recommended for outdoor use, which has more stringent temperature requirements (–40° C. to 80° C.). Factors leading to unacceptable optical loss may result from the intrinsic variability of the field polishing process, craftsman error, over polishing (e.g. using too much force or too many strokes and coarse, clogged or contaminated abrasive) or substitution of a different type of abrasive.

SUMMARY OF THE INVENTION

According to an embodiment of the present invention, an assembly tool for installing an optical fiber in an optical connector includes a base having a connector mounting region to receive and secure the optical connector on the base, the connector including a housing and a ferrule. The assembly tool further includes a protrusion setting mechanism to set a protrusion of the terminal end of the optical fiber, the protrusion corresponding to a distance the terminal end of the fiber extends from an end face of the connector ferrule.

The tool may also include a connector activation device an actuator arm pivotally mounted on the base adjacent to the connector mounting region to engage a fiber securing mechanism in the connector.

According to another embodiment of the present invention, a method is provided for installing an optical fiber in an optical connector, where the terminal end of the fiber extends from the end face of the connector ferrule by a predetermined distance. The terminal end of the fiber is prepared. An optical connector is placed into an assembly tool. The optical connector includes a housing and a ferrule. The prepared terminal end of the optical fiber is inserted into the connector. The protrusion distance is set, where the assembly tool includes a protrusion setting mechanism to set the protrusion of the terminal end of the optical fiber, the protrusion corresponding to a distance the terminal end of the fiber extends from an end face of the connector ferrule. The fiber can be inserted into the connector until the terminal end of the fiber rests against a fiber stop. The fiber may be edged forward a little more until a slight bow forms in the fiber outside of the connector. The optical fiber is then secured in the connector.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "forward," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention are directed to an assembly tool and method of installing an optical fiber in an optical connector, where the fiber has a predetermined fiber protrusion, without the need for polishing during or after connector installation.

Figure 1:
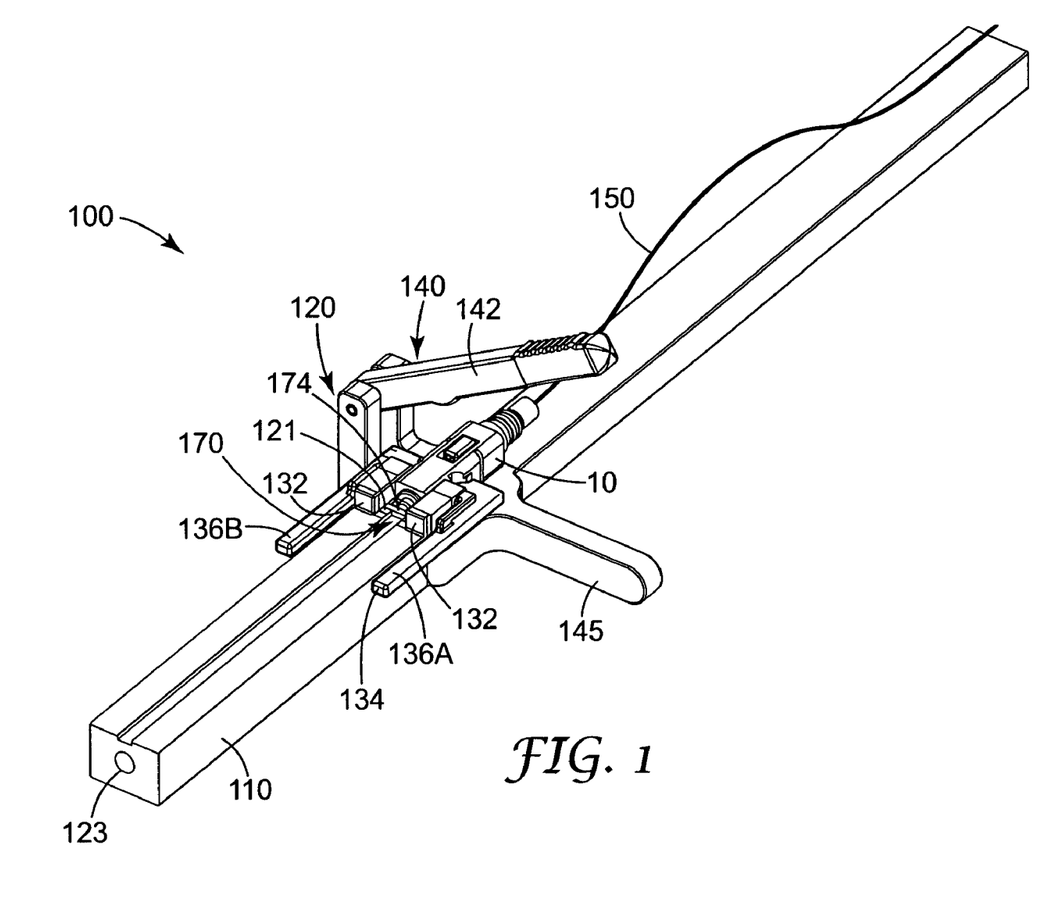
FIG. 1 shows an isometric view of an assembly tool according to an exemplary embodiment of the present invention.

FIG. 1 shows an exemplary embodiment of the present invention, Fiber optic connector assembly tool 100. The assembly tool 100 has a base 110 including a connector mounting region 120 to receive and secure the optical connector 10 on the base, a connector activation device 140, and a protrusion setting region 170 adjacent to the connector mounting region that includes a protrusion setting mechanism. The protrusion setting mechanism is used to set the protrusion of the terminal end 151 (see FIG. 2) of the optical fiber, where the protrusion corresponds to a distance (x) that the terminal end of the fiber extends from an end face of the connector ferrule. According to an exemplary embodiment, this protrusion distance can be a predetermined distance, such that each optical fiber connector being installed can have a matching fiber protrusion distance.

The assembly tool 100 provides for the consistent installation of a remote grip optical fiber connector, such as a Crimplok™ 6900 series connector available from 3M Company (St. Paul, Minn.) in several standard formats, such as SC & ST.

The connector mounting region 120 can reliably position the optical connector 10 in the assembly tool 100. The connector mounting region 120 can include alignment blocks 132, which engage with the connector housing to align the connector 10 in the tool 100. The connector mounting region can further include a connector clamp 134 which can engage with projections 55 on the housing 50 of the optical connector 10 (see e.g. FIG. 7) to secure the optical connector 10 on the base 110.

As shown in FIG. 1, the connector clamp 134 can have two arms 136A and 136B that when squeezed together open the clamp to allow insertion of the connector 10 into the tool 100. When arms 136A/136B are released, the clamp hooks (see e.g. hooks 137A and 137B shown in FIG. 5) engage projections 55 on the housing 50 of the optical connector 10, securing the connector in the assembly tool 100.

Figure 4:
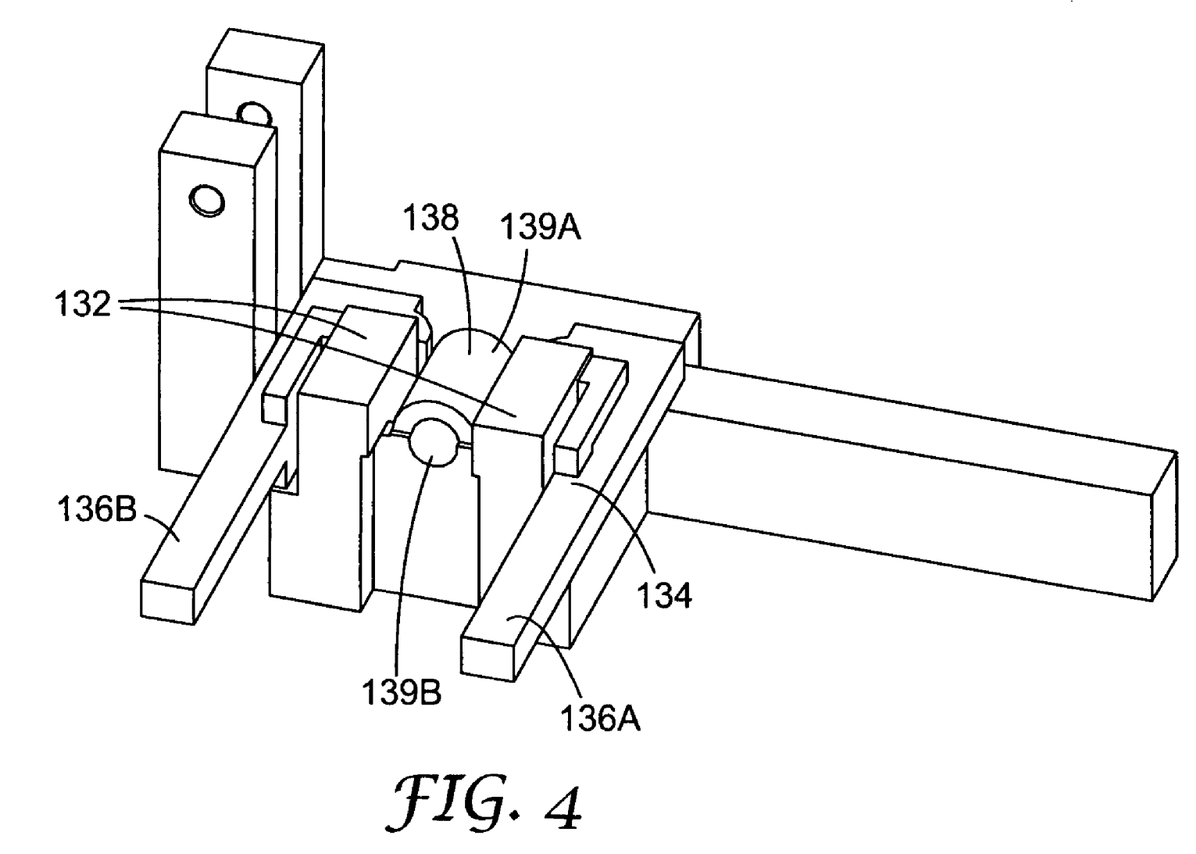
FIG. 4 shows an isometric view of an embodiment of a connector clamp according to another aspect of the present invention.
Figure 5:
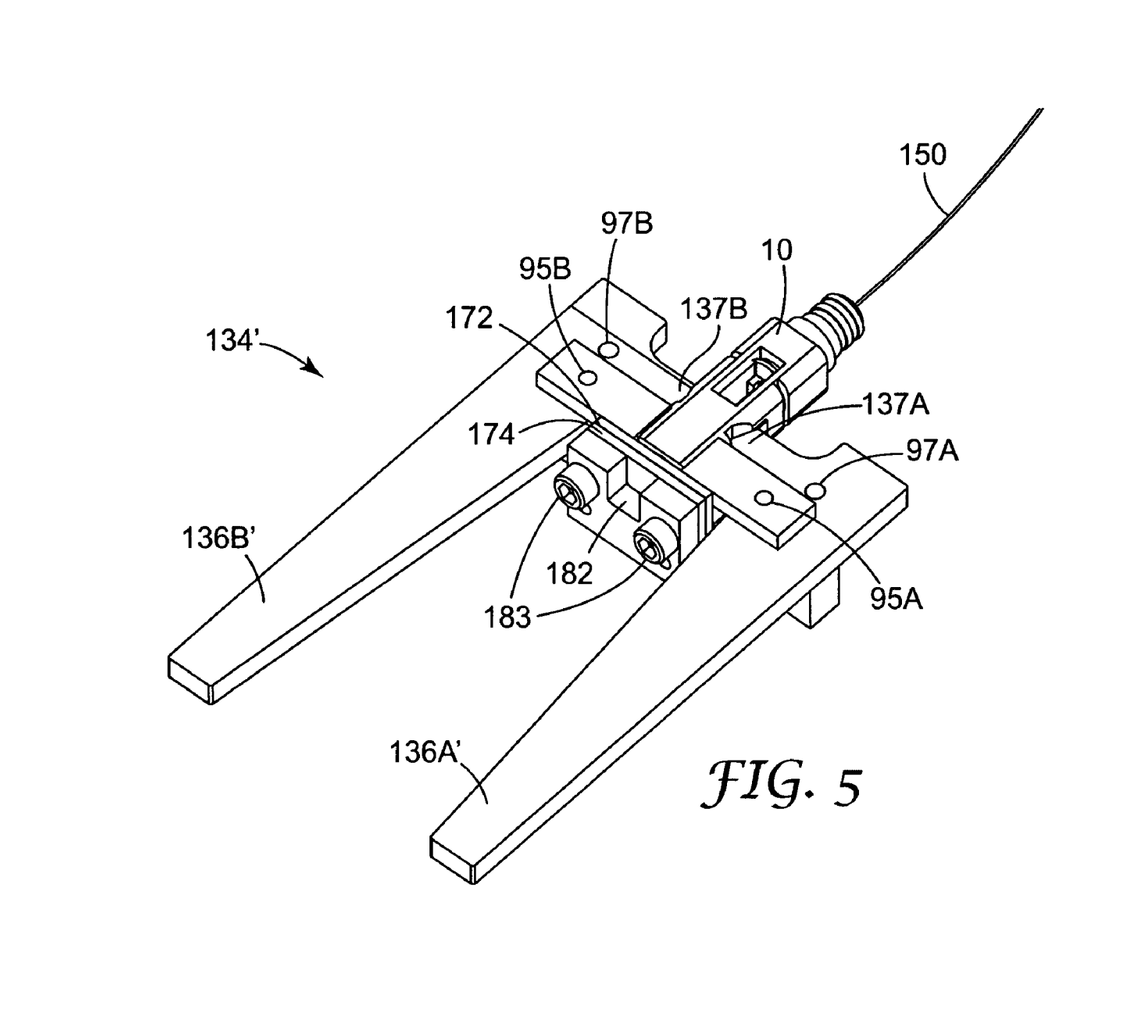
FIG. 5 shows an isometric view of an embodiment of a connector clamp according to a further aspect of the present invention.

The connector clamp 134 may be formed integrally with the base and alignment blocks (see e.g. FIGS. 1 and 4) or, alternatively, it may be a spring actuated assembly (see e.g. FIG. 5).

The mounting region may further include a ferrule guiding portion 138. For example, FIG. 4 shows a ferrule guiding portion 138 having a cantilevered cylindrical part 139A with a hole 139B bored there through to align the ferrule of the connector 10. The ferrule slides into the cylinder, which in turn slips between the ferrule and the connector housing. The end of the cylindrical portion opposite from where the connector is inserted is adjacent to the protrusion setting region.

The protrusion setting region 170 includes a protrusion setting mechanism to set the protrusion distance of the terminal end 151 of the optical fiber from an end face 15 of the connector ferrule 14. The protrusion distance can be a predetermined distance (x), such as from about 5 μm–60 μm, preferably from about 15 μm to about 35 μm. The protrusion setting mechanism may include a shim 172, (FIG. 2) and a fiber stop 174. The shim 172 and fiber stop 174 may be inserted into a slot 121 in the base 110 (FIG. 1) of assembly tool 100 and locked in place with an alignment pin (not shown). Alternative configurations of the protrusion setting mechanism are also described herein.

Figure 3A:
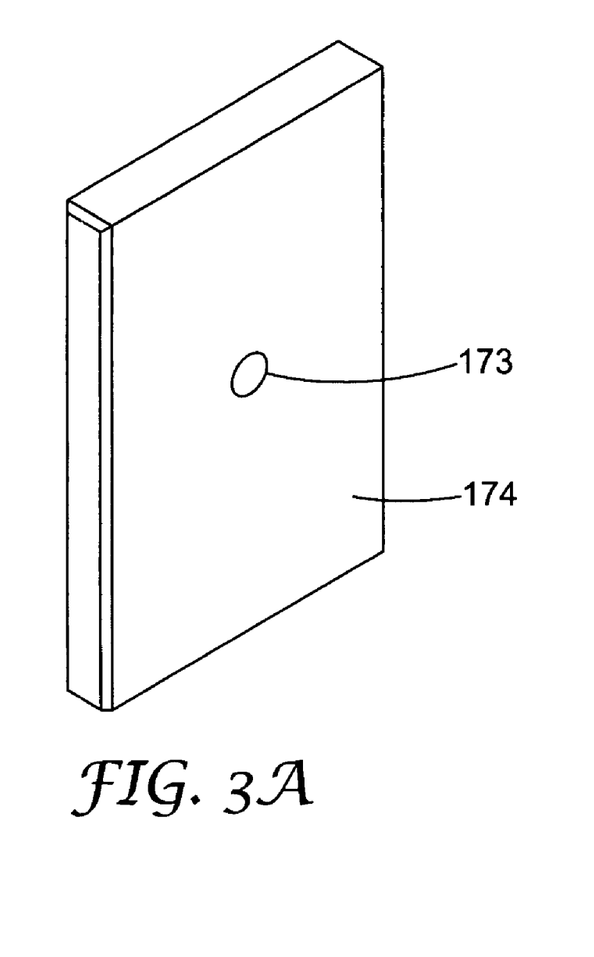
FIG. 3A shows an isometric view of a fiber stop of the assembly tool of FIG. 1.
Figure 3B:
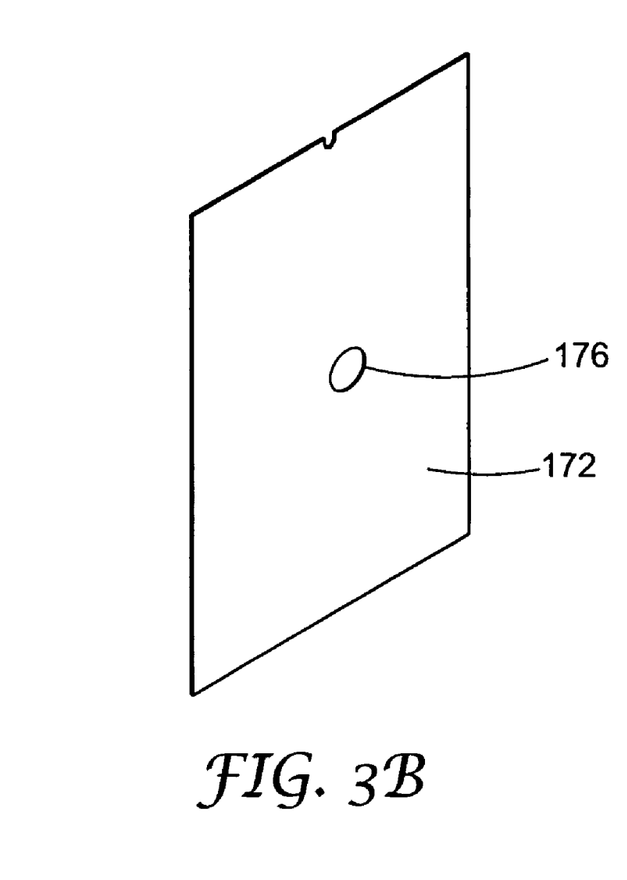
FIG. 3B shows an isometric view of a shim of the assembly tool of FIG. 1.

Referring back to FIG. 1, the assembly tool 100 may further comprise a hole 123 extending through at least a portion of the base to allow for the insertion of an alignment pin (not shown). The alignment pin may slide through hole 123 and through holes 176, 173 formed in the shim 172 and fiber stop 174 (see FIGS. 3A and 3B). This configuration can provide precise alignment of the fiber stop (and shim) and provides for securing the fiber stop (and shim) in place so these elements will not move during connector assembly. Alternatively, the shim and fiber stop may be secured in place by using a different mechanism, such as a compression plate 182 and screws 183, as shown in FIG. 5.

Figure 2:
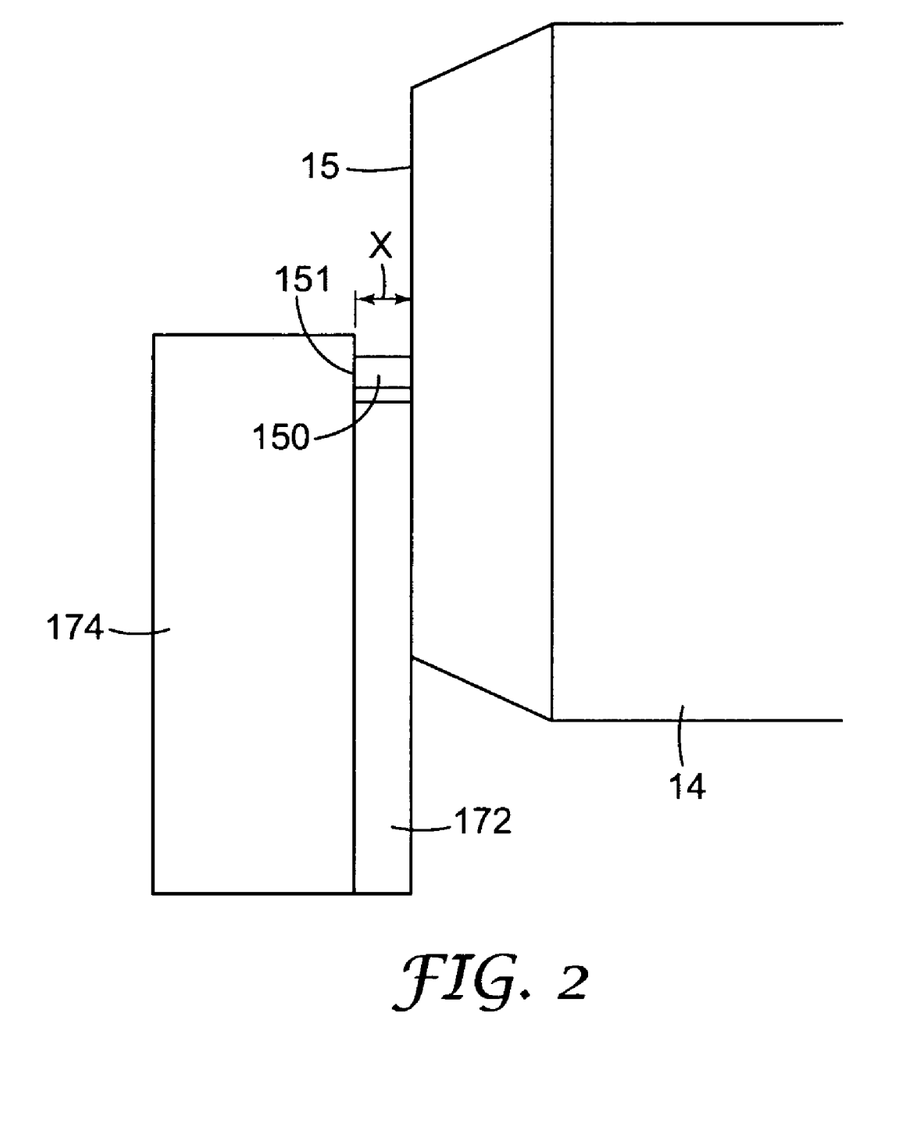
FIG. 2 shows a schematic view of setting the fiber protrusion distance according to another aspect of the present invention.

As mentioned above, the ferrule 14 may be inserted through a ferrule guiding portion 138 until its end face 15 contacts a surface of the shim 172. The fiber can then be inserted until the terminal end extends past shim 172 and then contacts the fiber stop 174. The thickness of the shim 172 can therefore be used to establish the protrusion distance of the fiber end 151 relative to the end face 15 of the ferrule 14. In one aspect, shim 172 has a thickness of from about 5 μm to about 60 μm, more preferably from about 15 μm to about 35 μm. Shim may be formed from one of a plastic, a metal, a ceramic and quartz. The shim 172 can include a hole or slot 176 aligned with the center hole of the ferrule 14 for proper alignment. Fiber stop 174 may be made of any suitable smooth rigid material that will not scratch the terminal end of the optical fiber, such as glass, polished metal, ceramic or plastic.

FIG. 2 shows a close-up (top) view of the protrusion-setting region 170 of tool 100 with an optical fiber 150 inserted through the ferrule 14. The distance, x, between the end face 15 of the ferrule and the fiber stop 174 corresponds to the protrusion of the fiber. In an exemplary embodiment, the position of the contact surface of the fiber stop 174 is adjustable so that the amount of protrusion may be changed as needed to accommodate setting the protrusion over a range of values. For example, one or more different thickness shims can be used with tool 100. For example, a first shim can provide a distance that would be required for the ambient assembly temperature, and therefore the protrusion would result at an amount required for proper operation at that temperature. Other shims of different thicknesses can be utilized for connector operation at other temperatures.

Figure 6A:
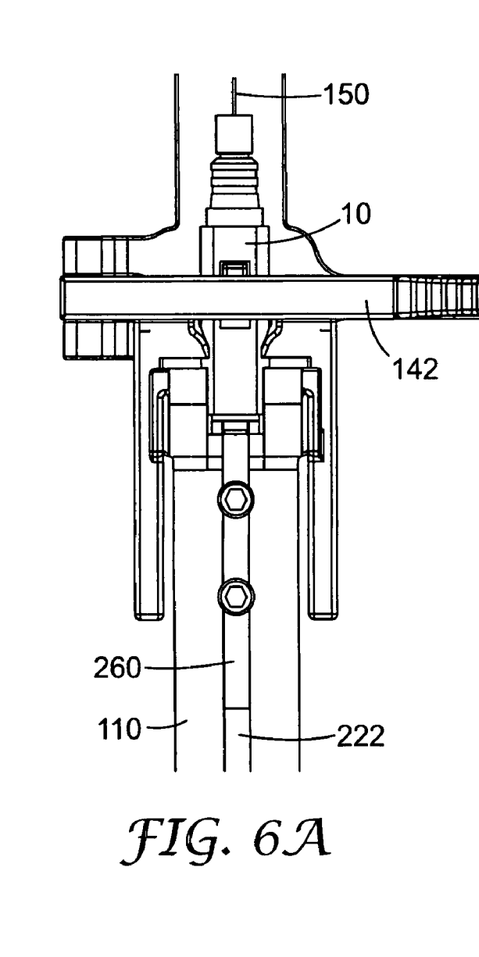
FIGS. 6A and 6B show views of a stopping block structure according to another aspect of the present invention.
Figure 6B:
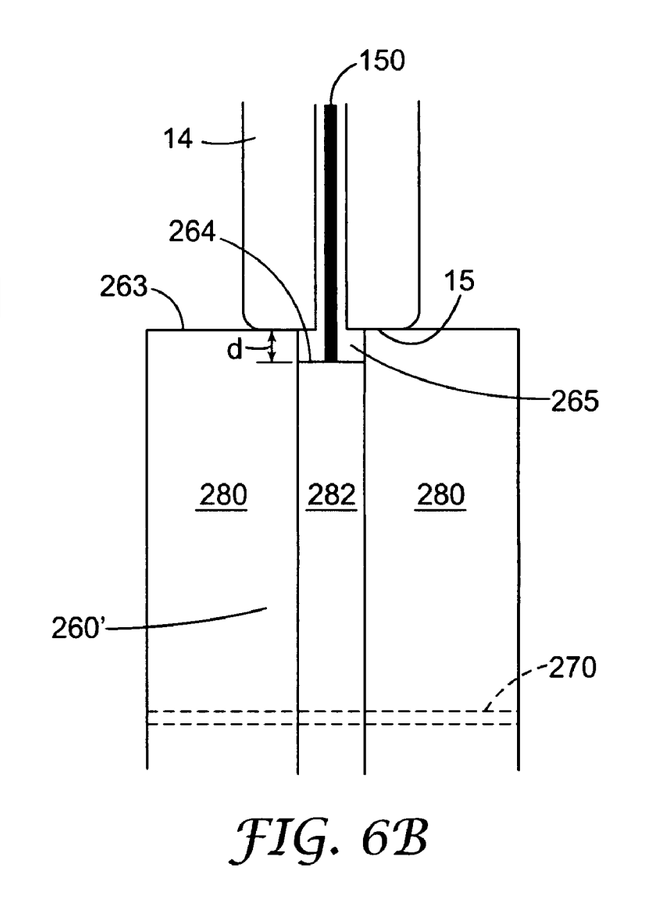

Alternatively, the protrusion setting mechanism can comprise a single stopping block structure (e.g. see FIGS. 6A and 6B). In his alternative aspect, the stop block 260 may be slidably engageable with the base 110 in a channel 222 configured to facilitate positioning of the stop block. The stop block 260 can include an indent portion 265 formed in a first surface 263, having a depth corresponding to the predetermined distance, d. The first surface 263 can be configured to engage with the end face 15 of the ferrule. The stop block can include a second surface 264, disposed in the indent portion 265, configured to engage with the terminal end of the fiber 150 such that the length of fiber extending beyond the ferrule end face has a length corresponding to distance d.

The stop block 260 can be a unitary piece of material with a hole or slot of a depth that is equal to the desired protrusion length of fiber. The stop block may be secured in the channel by one or more fasteners, such as screws or a setscrew. The stop block 260 may be formed from any of a variety of materials, including a plastic, a metal, a ceramic and quartz.

Alternatively, the stop block 260 may comprise a layered or stacked structure. For example, as shown in FIG. 6B, stop block 260 can include a first material 280 and a second material 282 disposed therebetween. These materials may be held together by a set screw or other fastener at a position some distance away from second surface 264. The materials 280, 282 can be selected such that thermal expansion behavior of the stop block 260 is similar to and compensates for the thermal expansion behavior of the fiber connector. For example, block 260 can be configured as a glass tube 280 surrounding a ceramic rod 282.

Additionally, the channel 222, formed on or in a surface of base 110, may alternatively be configured to position and align a light source and/or inspection scope (not shown). For example, a keying feature on the light source and/or scope can be configured to be received by channel 222.

Referring back to FIG. 1, the assembly tool 100 can include a connector activation device 140 that can be mounted on the base 110 for securing the optical fiber 150 in connector 10. For example, for a remote grip connector, activation device 1450 can actuate a fiber gripping portion 40 of connector 10, located behind the connector ferrule 14 (see e.g., FIG. 7). The activation device 140 may include an actuator arm 142 pivotally mounted on the base adjacent to the connector mounting region to engage fiber gripping portion 40 in the connector. The activation device may further include a member 145 extending from base 110 to provide the user with additional leverage during actuation.

FIG. 5 shows an alternative configuration of a connector clamping mechanism 134' having a spring clamping feature. In this configuration, the clamp includes two arms 136A', 136B' which are hingably connected to base 110 with hinge pins (not shown) inserted into holes 95A, 95B. A spring (not shown) can couple the arms 136A', 136B' via pins (not shown) that are inserted through holes 97A, 97B. Thus, to load a connector, an operator can squeeze arms 136A', 136B' inward. The optical connector can be inserted into the assembly tool. When the arms are released, the spring contracts drawing the clamp hooks 137A, 137B closer to engage with at least one protrusion 55, detent or groove formed in the connector housing 50.

As mentioned above, FIG. 7 shows an exemplary remote grip optical fiber connector 10 that includes a connector housing 50. Connector 10 further includes a fiber gripping portion 40 which includes a fiber gripping element positioned inside the connector body (and thus not shown) and a crimping cap that slides onto and actuates the gripping element. Connector 10 further includes a ferrule 14 disposed at one end of the connector housing 50 and a compressible sleeve 20 disposed at the other end of the connector housing 50. Connector 10 further includes a crimp ring 30 that slides over the sleeve to secure the strength members of the optical fiber cable to the connector and a strain relief boot (not shown) that controls the bend radius of the optical fiber as it exits the connector. An exemplary connector is described in U.S. Pat. No. 5,337,390 and is herein incorporated by reference.

Figure 7:
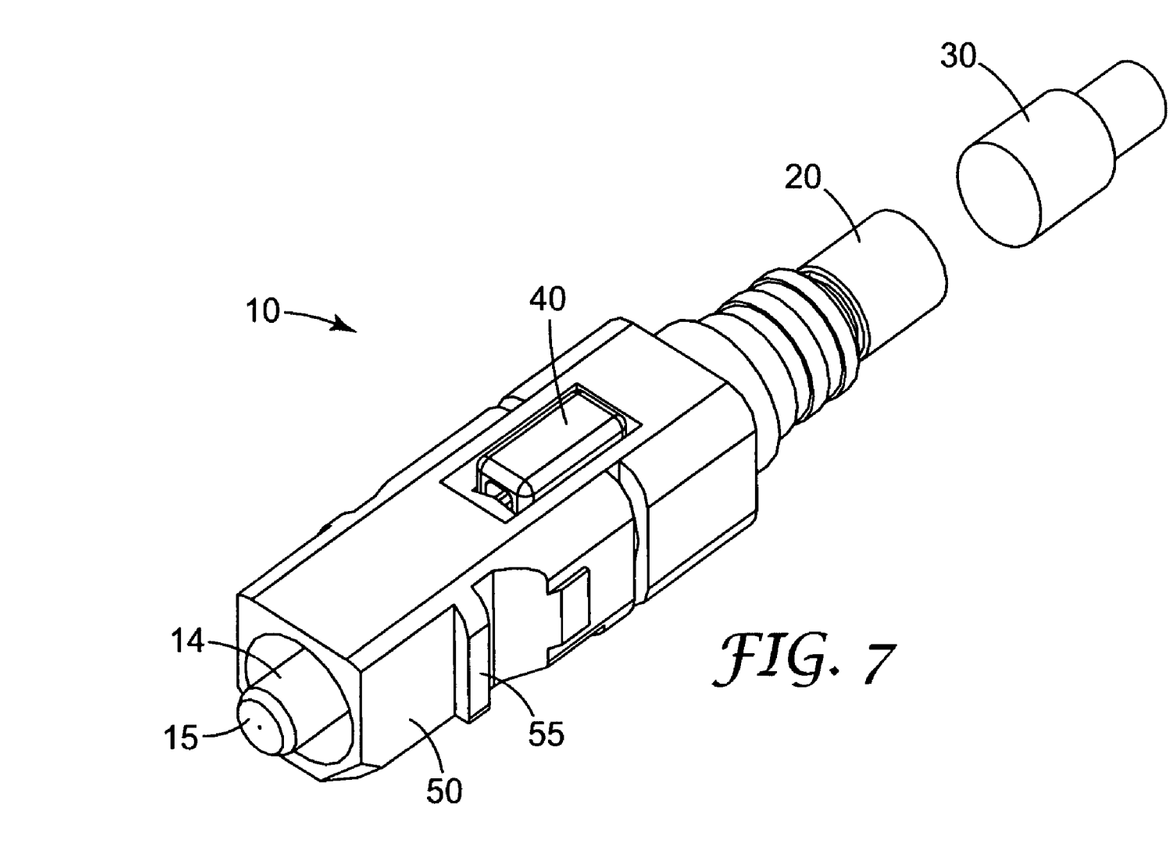
FIG. 7 shows an isometric view of an optical fiber connector.

Both the connector and ferrule have a bore in the longitudinal direction. These bores are aligned when the ferrule is joined to the connector housing 50 to allow the passage of an optical fiber therethrough.

To install an optical fiber in a remote grip optical connector with a known, predetermined length of fiber protruding from the endface of the ferrule, it is preferred that the terminal end of the fiber be prepared prior to insertion into the connector. This differs from conventional mounting of optical connectors in that conventional method of mounting of fibers requires significant fiber finishing (e.g., polishing) after the fiber has already been secured in the connector.

To prepare the terminal end of an optical fiber, any jacketing material, covering or coating is removed from the optical fiber in the proximity of the terminal end. In an exemplary aspect, the amount of coating removed can be enough to allow the fiber to be cleaved and have enough remaining fiber to pass through the connector body and protrude slightly from the connector ferrule 14. The end face of the fiber (i.e., terminal end 151) can be prepared in one of several different ways prior to insertion into the connector. For example, cleaving the fiber with an Oxford OFC 2000 to give a 90 degree cleave or an Oxford AFC-2008 an angled cleave (8° end angle) for reduced back reflection available from Oxford Fiber Optical Tools (Coventry, United Kingdom).

Another technique used separately or in addition to cleaving includes polishing the fiber with a series of precise sized grit polishing media, i.e. papers, slurries, etc. The polishing steps may include using finer and finer grit media until the desired end finish and shape is obtained. With polishing, the cleaving step can be skipped, and the fiber could be separated using a variety of methods.

A preferred fiber end face 151 preparation method that can be used is referred to as a "cleave & bevel" technique. This technique includes cleaving the fiber with a good quality commercial fiber cleaver, and then generating a conical bevel on the tip of the fiber with a machine that grinds the conical shape onto the end of the fiber without scratching the cleaved end face of the fiber. Examples of cleave and beveled fiber end faces are described in U.S. Pat. No. 5,734,779 and U.S. Pat. No. 5,812,718.

After the fiber is prepared, the fiber can be inserted through the optical connector until the terminal end of the optical fiber contacts the fiber stop 174. The fiber would then be set with a bow as to hold a slight amount of pressure of the end face of the fiber on the fiber stop. The actuation lever 142 can then be activated to lock the optical fiber in the connector. The connector can then be removed from the tool with a set protrusion of the finished end face 151 of the fiber from the ferrule end face 15.

After removal from the assembly tool, the Kevlar™ fibers can be fanned out around the connector and the crimp ring 30 slid forward until it seats against the back end of the connector. The crimp ring 30 is crushed into the strength members and the cable jacket. A strain relief boot (not shown) can be slid into place to complete assembly of the connector.

Alternatively, an adhesive, such as a structural or hot melt adhesive, can be used to secure the fiber in the optical connector.

While the invention has been described with respect to a single fiber remote grip connector, the use of a multi-fiber remote grip connector is also contemplated (e.g. a multi-fiber MT-type remote grip connector or a multi-fiber mechanical connector). In this implementation, the assembly tool 100 can be reconfigured to accept such a multi fiber connector in the connector mounting region 120, as would be apparent to one of ordinary skill in the art given the present description.

Thus, an optical fiber can be secured within an optical connector in a field environment in accordance with the apparatus and method described above. By contrast, conventional field polishing and installation of optical connectors is very craft sensitive and can result in a wide variability in the amount of fiber protrusion.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. An assembly tool for installing an optical fiber in an optical connector, comprising:
   a base having a connector mounting region to receive and secure the optical connector on the base, the connector including a housing and a ferrule disposed therein, and
   a protrusion setting mechanism to set a protrusion of a terminal end of the optical fiber, the protrusion corresponding to a distance the terminal end of the fiber extends from an end face of the connector ferrule, wherein the protrusion setting mechanism comprises a shim and a fiber stop.

2. The assembly tool of claim 1, wherein the optical connector is a remote grip optical connector.

3. The assembly tool of claim 1, further comprising an actuator arm pivotally mounted on the base adjacent to the connector mounting region to engage a fiber securing mechanism in the connector.

4. The assembly tool of claim 1, wherein the connector mounting region includes a connector clamp disposed on the base to secure the position of the connector housing relative to the base.

5. The assembly tool of claim 4, wherein the connector clamp is integrally formed with the base of the assembly tool.

6. The assembly tool of claim 4, wherein the connector clamp includes two arms engageable with a portion of the connector housing.

7. The assembly tool of claim 6, wherein the two arms are coupled to each other by a spring.

8. The assembly tool of claim 1, wherein the shim is formed from one of a plastic, a metal, and a ceramic and wherein the fiber stop is formed from one of a plastic, a metal, glass, quartz and a ceramic.

9. The assembly tool of claim 1, wherein the shim has a thickness of from about 15 μm to about 60 μm.

10. The assembly tool of claim 1, wherein the shim has a thickness of from about 15 μm to about 35 μm.

11. An assembly tool for installing an optical fiber in an optical connector, comprising:
    a base having a connector mounting region to receive and secure the optical connector on the base, the connector including a housing and a ferrule disposed therein, and
    a protrusion setting mechanism to set a protrusion of a terminal end of the optical fiber, the protrusion corresponding to a distance the terminal end of the fiber extends from an end face of the connector ferrule, wherein the protrusion setting mechanism comprises a stop block slidably engageable with the base.

12. The assembly tool of claim 11, wherein the first surface is configured to engage with the end face of the ferrule, and wherein the stop block comprises a second surface, disposed in the indent portion, configured to engage with the terminal end of the fiber.

13. The assembly tool of claim 11, wherein the base includes a channel to configured to facilitate positioning of the stop block.

14. The assembly tool of claim 11, wherein the stop block slidably engageable with the base includes a stacked structure having a first material and a second material, the materials selected such that a thermal expansion behavior of the stop block compensates for a thermal expansion behavior of the optical fiber connector.

15. The assembly tool of claim 11, wherein the stop block includes an indent portion formed in a first surface thereof having a depth corresponding to the distance the terminal end of the fiber extends from an end face of the connector ferrule.

16. The assembly tool of claim 11, wherein the optical connector is a remote grip optical connector.

17. The assembly tool of claim 11, further comprising an actuator arm pivotally mounted on the base adjacent to the connector mounting region to engage a fiber securing mechanism in the connector.

18. The assembly tool of claim 11, wherein the connector mounting region includes a connector clamp disposed on the base to secure the position of the connector housing relative to the base.

19. The assembly tool of claim 18, wherein the connector clamp includes two arms engageable with a portion of the connector housing.

20. The assembly tool of claim 19, wherein the two arms are coupled to each other by a spring.

* * * * *